United States Patent
Pawlak et al.

[11] 4,009,198
[45] Feb. 22, 1977

[54] ANTIDEGRADANT ESTERS

[75] Inventors: Joseph A. Pawlak, Buffalo; Francis J. Bajer, Depew, both of N.Y.

[73] Assignee: Hooker Chemicals & Plastics Corporation, Niagara Falls, N.Y.

[22] Filed: Dec. 30, 1974

[21] Appl. No.: 537,521

Related U.S. Application Data

[63] Continuation-in-part of Ser. No. 508,602, Sept. 23, 1974, abandoned, which is a continuation of Ser. No. 319,101, Dec. 27, 1972, abandoned, which is a continuation-in-part of Ser. No. 155,297, June 21, 1971, abandoned.

[52] U.S. Cl. .......................... 260/475 R; 252/403; 260/398.5; 260/468 G; 260/468 K; 260/468 J; 260/468.5; 260/475 FR; 260/475 F; 260/475 P; 260/485 F; 260/485 H; 260/485 G; 260/485 J; 260/45.85 B
[51] Int. Cl.² ........................................ C07C 93/26
[58] Field of Search ...... 260/475 FR, 475 F, 475 P, 260/475 R

[56] References Cited
UNITED STATES PATENTS

| | | | |
|---|---|---|---|
| 3,448,049 | 6/1969 | Preuss et al. ................. | 260/485 J |
| 3,699,154 | 10/1972 | Heintzelman et al. ......... | 260/485 G |
| 3,823,176 | 7/1974 | Levis et al. ................... | 260/475 P |
| 3,882,088 | 5/1975 | Thompson ..................... | 260/475 P |

*Primary Examiner*—Jane S. Myers
*Attorney, Agent, or Firm*—Peter F. Casella; William J. Crossetta, Jr.

[57] ABSTRACT

Compounds of the formula

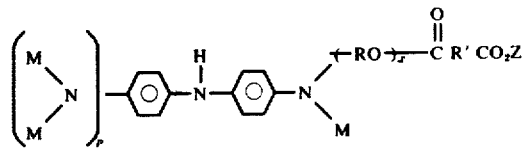

wherein, X is from 1 to 12; Z is a member selected from the group consisting of —H, —NH₄, alkali metal, lower alkyl and lower hydroxyalkyl; R is a member selected from the group consisting of ethylene, 1,2-propylene, 1,2-butylene, 2,3-butylene, styrylene and mixtures thereof; R' is selected from the group consisting of substituted or unsubstituted alkylene, alkenylene, cycloalkenylene, arylene and cycloalkylene moieties containing at least two nuclear carbon atoms and in which any substituent is selected from the group consisting of carboxy, halo and lower alkyl substituents; M is a member selected from the group consisting of hydrocarbon of 1-20 carbon atoms, $+RO+_xH$, and

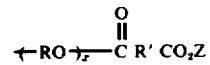

wherein R, X, R' and Z are as above defined; and P is an integer from 0–1, providing when p is 0,

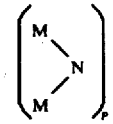

is hydrogen, are non-staining or slightly staining antioxidants possessing antiozonant properties for use as antidegradants in combination with oxidizable organic substrates.

13 Claims, No Drawings

ANTIDEGRADANT ESTERS

This application is a continuation-in-part of Ser. No. 508,602, filed Sept. 23, 1974, now abandoned, which is a continuation of Ser. No. 319,101, filed Dec. 27, 1972, now abandoned, which is a continuation-in-part of Ser. No. 155,297, filed June 21, 1971, now abandoned.

BACKGROUND OF THE INVENTION

Ideally, any antioxidant for organic substrates containing carbon-carbon unsaturation such as rubber or other plastic material, whether providing protection in the presence of atmospheric oxygen, ozone or any other oxidant, should not introduce objectionable characteristics into the substrate which make it hazardous to handle, more subject to premature curing or weaker physically. The antidegradant should prevent oxidative attack over extended periods of time without volatilization or change in visual appearance of the organic substrate caused by staining or change in color as by frosting as well as cracking or cutting of the substrate surface.

Antidegradants for use in any substrate subject to change induced by either chemical or physical action ideally prevent that change for extended time periods without adversely affecting the properties of the substrate. Any composite effect derived from the use of a single antidegradant such as combined heat, light, ageing, oxidation and flex cracking stability, extend the general applicability of that antidegradant.

Although attack on carbon-carbon unsaturation by ozone may be generically considered oxidation of the substrate, the intermediate ozonides and/or hydroperoxides present a unique problem which is not solved by antioxidants generally. Thus, antiozonants are a special group of antidegradents which in themselves may or may not be functional toward attack by atmospheric oxygen.

The function of ozone in initiating cracking of rubber has been studied extensively since 1945. Various antiozonants have been discovered which extend the useful life of rubber exposed to ozone by extending the time for initial cracking and retarding the extent of cracking in rubber. Many commercial antiozonants are derived from the N-substituted paraphenylenediamines.

Those N-substituted para-phenylenediamines prepared by alkylating para-aminodiphenylamine with a ketone such as the 4-isopropylamino diphenylamine are effective antiozonants and do not cause premature curing or retard the curing rate when used in rubber. However, the 4-alkylaminodiphenylamincs are colored and stain the rubber in which they have been incorporated.

Conventionally, anti-oxidants are introduced into rubber in the latex stage. A solid antioxidant is dispersed in the latex to provide a dispersion approaching as closely as possible a homogeneous mixture while liquid antioxidants are mixed with the latex by emulsification. At this point, it is very important that the antioxidant not affect premature coagulation of the rubber or cause creaming of the latex (rubber destabilization and separation from water in the latex). After introduction of the antioxidant, the rubber is coagulated to separate it from the water as an elastomeric dry material. The rubber appears as small agglomerated masses which are dried by hot air to form crumbs of rubber. Another addition of antioxidant is conventionally made to the crumb or to compressed crumb rubber during milling, extruding or other fabrication treatments.

BRIEF DESCRIPTION OF THE INVENTION

In accordance with this invention, there is provided a group of antidegradants of the formula

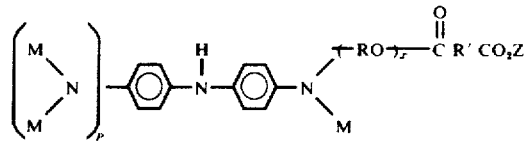

wherein
X is from 1 to 12;
Z is a member selected from the group consisting of —H, —NH$_4$, alkali metal, lower alkyl and lower hydroxyalkyl;
R is a member selected from the group consisting of ethylene, 1,2-propylene, 1,2-butylene, 2,3-butylene, styrylene and mixtures thereof;
R' is selected from the group consisting of substituted or unsubstituted alkylene, alkenylene, cycloalkenylene, arylene and cycloalkylene moieties containing at least two nuclear atoms and in which any substituent is selected from the group consisting of carboxy, halo and lower alkyl substituents;
M is a member selected from the group consisting of hydrocarbon of 1–20 carbon atoms, + RO$\rightarrow_x$H, and

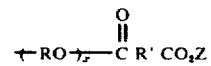

wherein R, X, R' and Z are as above defined; and p is an integer from 0–1, providing when p is O,

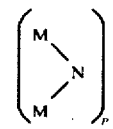

is hydrogen,

Of these compounds, the preferred classes of antidegradants are those in which;
 a. R' is selected from the group consistisng of the divalent alicyclic moieties of cyclopentane, cyclohexane, cyclohexane, bicyclo-(2.2.1)-5-heptene and hydrophenanthrene;
 b. those compounds in which R' is an ortho or peri arylene moiety selected from the phenylene and naphthylene nuclei; and
 c. those compounds in which R' is a divalent moiety selected from the group consisting of alkyl of 2–100 carbon atoms and alkylene and alkenylene radicals of 2 to 24 carbon atoms.

When M is a hydrocarbon of 1–20 carbon atoms it is preferred that said hydrocarbon be alkyl and cycloalkyl of 1–20 carbon atoms.

The novel antidegradants of this invention are particularly useful when incorporated into polyolefin compositions such as polyethylene, polypropylene, polybutylene, polybutadiene, polystyrene and copolymers thereof. The polyolefins generally possess molecular weights above 1,000 extending upwards into an including molecular weights of 1,000,000. The polyolefin may be of the high density, medium density or low density type. The polyolefin stabilized with the antidegradants of this invention are useful as coating materials as well as thermoplastic molding compounds. Polyethylene compositions containing the antidegradants of this invention are particularly useful as insulators or condensors in electronic equipment.

The compounds of this invention may be used to stabilize lubricants, either the synthetic or petroleum based greases and oils, including the aliphatic esters, polyalkylene oxides, silicones, phosphoric acid esters, silicic acid esters, polyfluorinated hydrocarbons, and the like. Lubricant oils of petroleum origin with which the antidegradant of this invention may be incorporated, include the motor oils, transmission oils, cutting oils, hydraulic oils, and the like, known in the industry.

The compounds of this invention may be incorporated into synthetic greases such as the alkali metal, alkaline earth and aluminum base greases in solid or semi-solid gel form.

Furthermore, the compounds of this invention may be added to motor fuels that contain saturated and unsaturated blends of hydrocarbon materials.

The compounds of this invention can be incorporated into elastomeric compounds as exemplified by natural and synthetic rubbers such as butyl-nitrile rubbers, styrene butadiene rubbers, neoprenes, polyisoprenes, polybutadienes, polyisobutylenes, polychlorobutadienes and the like.

Throughout the remaining portion of the disclosure, the discussion and exemplification of the use of the compounds of this invention is made with specific reference to styrene-butadiene rubber. It is to be understood that for the purpose of preventing oxidation either from atmospheric oxygen or ozone, the compounds of this invention may be used in a manner known to the stabilizing art in conjunction with any carbon-carbon unsaturated materials, including waxes and synthetic resins, as well as natural rubber, and especially with the synthetic rubbers of which styrene-butadiene rubber (SBR) is exemplary.

Non-discoloring types of styrene-butadiene rubber generally contain either an aralkyl phosphite or an alkylated or aralkylated phenolic type antioxidant. The staining types of styrene-butadiene rubber contain para-phenylenediamine type antioxidants, conventionally applied in from 0.2 to about 2.5 parts per 100 parts of rubber. Surprisingly, the compounds of this invention, although derived from the staining type antioxidants are non-staining or so slightly staining as to produce negligible discoloration in the rubber product. Thus, the excellent antioxidant stabilizing properties of the para-phenylenediamine type antidegradants are extended into the non-discoloring fluid of application by the compounds of this invention.

The antidegradants of this invention may be employed in acid or ester form to produce dispersions, emulsions or solutions which are mixed with rubber latex during coagulation and protect this latex during subsequent treatment.

The compounds of this invention need not be added to styrene-butadiene rubber in the latex stage but are also applicable as antidegradants when added to the rubber crumb or baled crumbs at the mill or other fabrication stage. Thus, the compounds of this invention may be incorporated into an oxidizable organic substrate containing carbon-carbon unsaturation, such as styrene-butadiene rubber, in an amount from about 0.01 to about 5 parts per 100 parts of substrate, to afford non-staining to slightly staining compositions with improved stability toward oxidation by atmospheric oxygen and ozone.

DETAILED DESCRIPTION OF THE INVENTION

The compounds of this invention represent acid esters of N-oxyalkylenated 4-aminodiphenylamines and N-oxyalkylenated 4,4'-diaminodiphenylamines. The amine components of the ester are produced by known techniques such as is disclosed in U.S. Pat. No. 3,330,777. Generally, the 4-aminodiphenylamine or 4,4'-diaminodiphenylamine reactant is oxyalkylenated with ethylene oxide, propylene oxide, 1,2-butylene oxide, 2,3-butylene oxide, styrene oxide of mixtures thereof to introduce at least one hydroxy alkyl group to a free amino group thereby producing a secondary or tertiary amine. With the introduction of a basic catalyst and an additional amount of the alkylene oxide reactant, the chain length of the N-hydroxyalkylated group may be extended to afford amine or diamine derivatives containing up to about 12 repeating alkoxy groups with one or more terminating hydroxyl groups.

The N-oxyalkylenated 4-aminodiphenylamine or 4,4'-diaminodiphenylamine intermediate is subsequently esterified with a stoichiometric amount of a carboxylic acid anhydride to afford the half esters of this invention. When two or more oxyalkylated groups are available for reaction with the anhydride, control of the ratio of reactants enables the production of compounds containing the unreacted $-(\text{RO})_{\overline{x}}$ H radical. The performance of the process for reaction of a dicarboxylic acid anhydride with alcohols of the type involved in the N-oxyalkylenated-4-aminodiphenylamine or 4,4'-diaminodiphenylamine reactants is by known techniques. The free carboxylic acid group of the acid ester so derived, may be converted to the alkali metal salt by reaction with sodium hydroxide or to the ammonium salt by the introduction of ammonium hydroxide or, it may be converted to a simple ester by the introduction of a monofunctional alcohol such as methanol, ethanol, propanol, butyl alcohol, amyl alcohol, or a lower alkylene oxide carbonate and the like. Of the carboxylic acid anhydrides employed in the production of the compounds of the instant invention, it is preferred to employ those acid anhydrides in which the free carboxylic acid, salt or simple ester derivative will provide a sufficient amount of hydrophilicity to assist in the introduction of the antidegradant into substrate systems containing water or sufficient hydrophobicity to tailor the antidegradant compound for use in hydrocarbon and analogous non-aqueous substrates. Of the carboxylic acid anhydrides those of special interest include the anhydride produced by the Diels-Alder condensation of maleic anhydride and rosin, phthalic anhydride, maleic anhydride, succinic anhydride, itaconic anhydride, camphoric anhydride, citraconic anhydride, cyclohexane 1,2-dicarboxylic anhydride, cyclohex-4-ene 1,2-dicarboxylic anhydride, 3,4,5,6-tetrachlorophthalic anhydride, cyclopentane 1,2-dicarboxylic anhydride, mellophanic anhydride (1,2,3,4-benzene tetracarboxylic acid), mellitic anhydride (benzene hexacarboxylic acid), trimellitic anhydride, chlorendic anhydride, anhydride products of terpenic like compounds with maleic anhydride, such as $\beta$-pinene, dipentene, $\alpha$-terpinolene and the like.

EXAMPLE 1

N,N-dihydroxyethyl-N'-phenyl-para-phenylenediamine

Fifty pounds of para aminodiphenylamine were charged to a reactor and heated to 142° C, with 23 inches of mercury vacuum on the reactor. The reactor was then sealed and 27 pounds of ethylene oxide were fed to the reactor over a period of 52 minutes at a reaction temperature of 142°–172° C. at a rate to moderate pressure buildup. The reaction was exothermic and cooling was required to hold the temperature in the desired range. The reaction mixture was allowed to stir for an additional 19 minutes. The final product, after cooling, was a dark colored solid exhibiting hydroxyl number of 470, a molecular weight ($\overline{Mn}$) of 286, a nil primary amine content, a secondary amine content of 0.34 milliequivalents per gram of sample and a tertiary amine content of 3.38 milliequivalents per gram of sample.

EXAMPLE 2

N,N-dihydroxyethyl-N'-phenyl-para-phenylenediamine 552.6 grams by weight of para-aminodiphenylamine were charged to a 2-liter flask equipped with a mechanical stirrer, gas inlet tube for subsurface additions, a thermometer and a capillary tube immersed in an oil bath as a venting device on the exit side of the flask. The amine was heated to 133° C and 293.6 grams of ethylene oxide were then added over a period of 1 hour and 10 minutes at a reaction temperature of 133°–174° C. and at a rate to avoid excessive bubbling. Cooling was required to hold the temperature in the desired range. The final cooled product was a dark colored solid which exhibited a hydroxyl number of 495, a molecular weight ($\overline{Mn}$) of 287, a nil primary amine content, a secondary amine content of 0.17 milliequivalents per gram of sample and a tertiary amine content of 3.35 milliequivalents per gram of sample.

EXAMPLE 3

N,N-dihydroxypropyl-N'-phenyl-para-phenylenediamine 552.6 Grams of para-aminodiphenylamine were charged to a 2-liter flask equipped with a pressure equalized dropping funnel, nitrogen gas inlet, mechanical agitator, thermometer with a thermowatch and a five bulb water cooled condenser. The para-aminodiphenylamine was heated to 168° C. under a nitrogen gas atmosphere and 357.2 grams of propylene oxide were added over a period of 7 hours at a rate to avoid excessive refluxing. The reaction mixture was allowed to stir for an additional 58 minutes. The final cooled product was a dark solid exhibiting a hydroxyl number of 423, a nil primary amine content, a secondary amine content of 0.22 milliequivalents per gram of sample, a tertiary amine content of 3.23 milliequivalents per gram of sample and a molecular weight ($\overline{Mn}$) of 308.

EXAMPLE 4

N,N-dihydroxypropoxypropyl-N'-phenyl-para-phenylenediamine

Following the procedure of Example 3,552.6 grams of para-amino-diphenylamine were reacted with 697 grams of propylene oxide in the presence of 2.8 grams of anhydrous sodium acetate. The reaction product was worked up essentially in the same manner as that of Example 3. The final cooled material was a very highly viscous liquid possessing a hydroxyl number of 334, a molecular weight ($\overline{Mn}$) of 397, a nil primary amine content, a secondary amine content of 0.36 milliequivalents per gram of sample and a tertiary amine content of 2.57 milliequivalents per gram of sample.

EXAMPLE 5

Half Ester of Gum Rosin - Maleic Anhydride Adduct and N,N-dihydroxyethyl-N'-phenyl-para-phenylenediamine 76.9 Pounds of gum rosin were charged to a reactor and heated under a nitrogen atmosphere to 131° C. 24.9 pounds of maleic anhydride were added in four parts over a period of 35 minutes to control the reaction exotherm. The temperature of the reaction mixtures rose to 187° C. after the second addition and was controlled by cooling. The reaction mixture was held between 181°–188° C after the maleic anhydride addition for 2 hours. 28.1 pounds of N,N-dihydroxyethyl-N'-phenyl-para-phenylenediamine prepared by procedure of Example 1, but exhibiting a nil primary content, a secondary amine content of 1.16 milliequivalents per gram of sample, a tertiary amine content of 2.64 milliequivalents per gram of sample, a hydroxyl number of 489 and a molecular weight ($\overline{Mn}$) of 263 were added in three portions. No exotherm was observed. The reaction mixture was held between 174°–182° C. for 1 hour at which time the mixture was discharged from the reactor. The product had an acid number of 226 (theory= 219.7) and melted at 110°–124° C.

EXAMPLE 6

Acid Phthalate of N,N-dihydroxyethyl-N'-phenyl-para-phenylenediamine

77 Pounds of the oxyethylated para-aminodiphenylamine of Example 1 at a temperature of 150° C and under a nitrogen gas atmosphere were reacted with 95.5 pounds of phthalic anhydride in a suitable reactor. The phthalic anhydride was added in four parts over a 33 minute period to keep temperature fluctuations at a minimum. The reaction mixture was allowed to stir for 1 hour and 47 minutes at temperature of 140°–165° C at which time the mixture was discharged from the reactor. The final product exhibited an acid number of 207 (theory=209.7) and melted at 96.4°–104° C.

EXAMPLE 7

Acid Phthalate of N,N-dihydroxypropyl, N'-phenyl-para-phenylenediamine 265.2 Grams (2 hydroxy equivalents) of the product of Example 3 were weighted into a 1 liter, 3-necked flask and heated under nitrogen atmosphere to 146° C. 296.2 grams (2 moles) of phthalic anhydride were added slowly to the reaction vessel at a temperature of 141°–146° C. The reaction mixture was then held at 141°–155° C for an additional hour at which time it was discharged. The final product had an acid number of 195.9- 203.7 (Theory=199.9) and melted at 112°–119° C.

EXAMPLE 8

Acid phthalate of N,N-dihydroxypropoxypropyl-N'-phenyl-para-phenylenediamine Into a 1 liter flask were placed 335.9 grams (2 hydroxyl equivalents) of the oxypropylated para-aminodiphenylamine of Example 4. 296.2 grams (2 moles) of phthalic anhydride were introduced into the reaction vessel and the reaction was conducted in the same manner as that presented in Example 7. The final product had an acid number of 184.5 (Theory=177.5) and melted at 103°–106° C.

EXAMPLE 9

Acid Succinate of N,N-dihydroxyethyl-N'-phenyl-para-phenylenediamine

Into a 500 milliliter 3-necked flask equipped with a nitrogen inlet tube, glass stirrer, thermometer and a five bulb condenser, were weighed, 113.3 grams (1.00 hydroxyl equivalent) of N,N-dihydroxyethyl-para aminodiphenylamine product of Example 2 and 100.1 grams (1.00 mole) of succinic anhydride. The reaction was conducted under a nitrogen blanket with agitation of the reaction mixture. The total reaction time was 1 hour and 49 minutes at temperatures of 142.7°–163.0° C. The final product had an acid number of 259.7 (Theory=262.9) and melted at 44°–54° C.

EXAMPLES 10 and 11

Acid Esters of Hexahydrophthalic Anhydride and Δ4-Tetrahydrophthalic Anhydride Additional acid esters of the N,N-(hydroxyethyl) para-aminodiphenylamine product of Example 2 were prepared in accordance to procedures set forth in the preceding example. The reagents, proportions and characteristics of the resulting products are set forth in Table 1.

TABLE 1

|  | Example 10 | Example 11 |
|---|---|---|
| Product of Example 2, parts/Wt. | 113.3 | 56.6 |
| Hexahydrophthalic anhydride, parts by weight | 154.2 | — |
| Δ⁴-Tetrahydrophthalic anhydride, parts by weight | — | 76.0 |
| Acid number - Theory | 209.7 | 211.3 |
|  - Found | 241.8 | 233 |
| m.p. ° C. | 68–77 | 75–83 |
| Reaction time | 1 hr. 46 minutes | 1 hr. 48 min. |
| Reaction temperature ° C. | 147–168.8 | 145.1–172.2 |

EXAMPLE 12

Acid Chlorendate of N,N-dihydroxyethyl-N'-phenyl-para-phenylenediamine

Into a 1 liter, 3-necked flask were charged 28.3 grams (0.25 equivalents of OH) of the product of Example 2 and 92.7 grams (0.25 moles) of 1,4,5,6,7,7-hexachlorobicyclo [2.2.1]-5-heptene-2,3-dicarboxylic anhydride. To the reaction mixture was added 250 milliliters of chemically pure acetone. Under a nitrogen blanket and agitation, the reaction was conducted at reflux temperature for 4 hours and 5 minutes. The acetone solvent was removed by vacuum distillation. The final product exhibited an acid number of 137.6 (Theory= 115.9), melted with decomposition from 136° to 152° C, darkening at 136°–148° C and melting with foaming at 148°–152° C.

EXAMPLE 13

Acid 3,4,5,6-Tetrachlorophthalate of N,N-dihydroxyethyl-N'-phenyl-para-Phenylenediamine Following the procedure set forth in the preceding example, 28.3 grams (0.25 equivalents of hydroxyl groups) of the product of Example 2 and 71.5 grams (0.25 moles) of 3,4,5,6-tetrachlorophthalic anhydride were dissolved in 500 millilters of acetone. The reaction mixture was refluxed 4 hours. The product was precipitated by adding the acetone solution to an excess of distilled water. The product was filtered and dried. The acid number of the product was 185.8 (Theory=140.5). The melting point was 131°–139° C.

EXAMPLE 14

Acid Maleate of N,N-dihydroxypropoxypropyl-N'-phenyl-para-phenylenediamine.

168.0 Grams (1.0 equivalents of hydroxyl groups) of the oxypropylated para-aminodiphenylamine of Example 4 and 98.1 grams (1.0 mole) of maleic anhydride were charged into a 500 milliliter, 3-necked flask equipped with a nitrogen gas inlet tube, glass stirrer, thermometer with a thermowatch and a five bulb water cooled condenser. The reaction mixture was heated to 151° C and held for 1 hour at 148°–155° C. The final product melted at 81°–93° C.

EXAMPLE 15

2-Hydroxyethyl Esters of Example 5

A 3-necked flask, equipped with a nitrogen inlet, stirrer, thermometer, and five bulb condenser, containing 300 grams of the product from Example 5 (1.24 carboxyl equivalents), 3.0 grams potassium carbonate, and 108.7 grams (1.24 moles) of ethylene carbonate were heated to 165° C. This mixture was held at 127°–133° C for 3.5 hours. The solid product (m.p. 71°–82° C.) exhibited a nil acid number.

EXAMPLE 16

2-Hydroxyethyl Esters of Example 6

A 3-necked flask equipped as in Example 16, containing 274 grams (1.0 carboxyl equivalent) of the product from Example 6, 2.7 grams potassium carbonate, and 88.1 gram (1 mole) ethylene carbonate were heated at 165°–168° C for 3 hours and 40 minutes. The solid product melted at 55°–67° C. and had a nil acid number.

EXAMPLE 17

Preparation of Methyl Esters

Methyl esters of the acids cited in earlier examples can be prepared by standard methods. One particularily easy method is as follows:

Take 0.1–0.2 parts of acid to be esterified and dissolve in a 1/1 methanol-ether mixture. Add an etheral diazomethane solution, prepared by slowly adding 20 grams of N-methyl-N'-nitro-N-nitrosoguanidine to a liter Erlenmeyer flask containing 400 milliliters of 20 percent KOH and 400 milliliters of chilled ether, slowly until a permanent diazomethane color persists. Let the solution set 10–15 minutes. The solvent is removed with a gentle stream of nitrogen leaving the desired methyl ester.

The antidegradants of this invention were dispersed, emulsified or solubilized in accordance with known and established procedures and subsequently added to a rubber latex. Thereafter, salt acid coagulation procedures were used to prepare dry crumb rubber stocks containing acid antidegradants at the 1,2 or 3 phr (parts per hundred parts rubber) level. For comparative purposes, Flexzone 6-H (N-phenyl-N'-cyclohexyl-p-phenylenediamine) was used as a standard control.

Illustrative of the anti-ageing properties of the antidegradant compositions of this invention are the compositions based on Example 5, Example 6 and Example 8 cited previously and representing the rosin acid and phthalic derivatized compositions respectively. When incorporated into the rubber latex, as described above, coagulated and dried at the levels shown in Table II, ageing studies were made on the gum rubber stocks thus prepared and the resulting vulcanizate compositions.

Heat ageing studies on the raw gum rubber stocks were carried out by taking representative samples of dried crumb (SBR) rubber. The rubber was heat aged in a forced air oven at a temperature of 100° C. for the stated periods of time, represented as days and determining the percentage of gel formed. Table II illustrates the results of this type of ageing study with antidegradant compositions. Example 5 (Mix A), Example 6 (Mix B), Flexzone 6-H (Mix C) were added at the 3 phr antidegradant level of addition, and an antidegradant composition based on Example 8 (Mix D) at the 1 phr antidegradant level of addition.

TABLE II

| Heat Ageing in Circulating Air Oven at 100° C. | | | | | |
|---|---|---|---|---|---|
| | | Mix A | Mix B | Mix C | Mix D |
| Antidegradant (phr) | | 3 | 3 | 3 | 1 |
| Unaged, | % gel | nil | nil | nil | nil |
| Aged, | % gel | | | | |
| | 6 day | nil | nil | 2.0 nil | |
| | 7 day | nil | 5.0 | 17.0 | 3.0 |
| | 9 day | 4.0 | 20.0 | 56.0 | 20.0 | nil = less than 1% gel.

Vulcanizate properties were similarly studied on these same rubber stocks using the procedures and preparations described in ASTM designation D15-70 on the vulcanizate formulation shown below.

| Ingredient | Parts by Weight |
|---|---|
| SBR-1500 crumb rubber* | 100 |
| Circosol 4240 (napthenic type processing oil) | 25 |
| HAF Black (N-330) (high abrasion furnace carbon black) | 62.5 |
| Zinc oxide | 3 |
| Stearic acid | 1 |
| Sulfur | 1.75 |
| N-t-butylbenzothiazole-2-sulfenamide | 1.25 |
| Mix E - composition from Example 5 | 2 |
| Mix F - composition from Example 6 | 2 |
| Mix G - Flexzone 6-H | 2 |

*Crumb rubber resulting from the salt acid coagulation technique.

After compounding and milling, these rubber stocks were cured for 50 minutes and 90 minutes at 293° F. to provide samples for the study. Comparisons were made for unaged and aged vulcanizate properties. These results are shown in Table III.

TABLE III

| Vulcanizate Properties - Unaged and Aged | | | |
|---|---|---|---|
| | Mix E | Mix F | Mix G |
| Unaged | | | |
| Tensile, psi | | | |
| 50 minutes | 2750 | 2770 | 2885 |
| 90 minutes | 2795 | 2970 | 2925 |
| 200% Modulus | | | |
| 50 minutes | 650 | 790 | 920 |
| 90 minutes | 740 | 900 | 935 |
| Elongation, % | | | |
| 50 minutes | 620 | 520 | 515 |
| 90 minutes | 560 | 505 | 515 |
| Aged: 3 days at 100° C. | | | |
| Tensile, psi | | | |
| 50 minutes | 2810 | 2735 | 2815 |
| 90 minutes | 2985 | 2520 | 2755 |
| 200% Modulus | | | |
| 50 minutes | 1605 | 1900 | 1305 |
| 90 minutes | 1380 | 1565 | 1395 |
| Elongation, % | | | |
| 50 minutes | 335 | 285 | 415 |
| 90 minutes | 305 | 305 | 365 |

EXAMPLE 18

Preparation of Ammonium Salt of Example 6

374.7 Grams of distilled water and 25.3 grams of concentrated ammonium hydroxide (28.0–30.0% $NH_3$) were charged to a 1 liter flask equipped with a mechanical stirrer, thermometer and water cooled condenser. 100 grams of the pulverized product of Example 6 were added to the reaction mixture under agitation over a 2 minute period. The reaction was exothermic as evidenced by a temperature rise from 25° to 34.5° C. The solution which was filtered and transferred to a bottle was stable.

EXAMPLES 19-23

Preparation of Ammonium Salts

Additional ammoniacal solutions of the acid esters described in the previous examples were prepared in accordance to procedures set forth in Example 19. The reagents and proportions used are set forth in Table IV

TABLE IV

| | Examples | | | | |
|---|---|---|---|---|---|
| | 19 | 20 | 21 | 22 | 23 |
| Product of Example | 9 | 10 | 11 | 12 | 13 |
| Parts by weight of | 20 | 20 | 20 | 20 | 20 |

TABLE IV-continued

| | Examples | | | | |
|---|---|---|---|---|---|
| reactant | 19 | 20 | 21 | 22 | 23 |
| Distilled water - parts by weight | 74.0 | 74.4 | 74.6 | 176.8 | 75.7 |
| Ammonium hydroxide (28.0–30.0% NH₃) | 6.0 | 5.6 | 5.4 | 3.2 | 4.3 |

All were clear, dark colored, stable solutions.

EXAMPLE 24

Preparation of Potassium Salts

162 Grams of distilled water and 438 grams of a 2.0182 Normal potassium hydroxide solution were charged to a suitable reactor. 200 Grams of pulverized product of Example 6 were added with agitation over a 5 minute period. The mixture was agitated to dissolve the resin. The solution was filtered but there was no evidence of insoluble material. The final solution exhibited a pH at 26.5° C of 8.86.

The compounds prepared in Examples 18–24 are soluble in latex-water emulsions and are substantially retained by the rubber upon coagulation.

EXAMPLE 25

Acid Maleate of N,N-dihydroxyethyl-N'-phenyl-para-phenylenediamine

A mixture of 100 grams (0.681 hydroxyl equivalents) of N,N-dihydroxyethyl-N'-phenyl-para-phenylenediamine and 66.8 grams of maleic anhydride (0.681 moles) were heated under a nitrogen blanket to about 110°–120° C. for a period of approximately 1.5 hours. The product exhibited a melting point of 90°–92° C. and an acid number of 205.7 (229.0 theory).

EXAMPLE 26

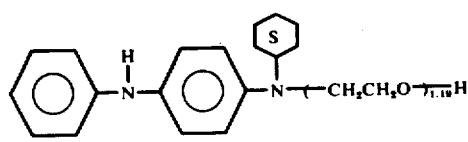

476.7 Grams by weight of N-phenyl-N'-cyclohexyl-p-phenylenediamine was charged, under vacuum, to a 1 liter pressure reactor and heated to 100° C. The reactor was sealed and the amine was further heated to 156° with agitation. 94 Grams by weight of ethylene oxide was added over an 18 minute period at a reaction temperature of 146°–156° C and reaction pressures of up to 102 psig. The reaction mixture was then allowed to stir for an additional 2 hours and 14 minutes at 146°–156° C. until the pressure gauge indicated zero pressure. The final product, after cooling, was a dark very thick paste exhibiting a nil primary and secondary amine content and a tertiary amine level of 2.88 milliequivalents per gram of sample.

EXAMPLE 27

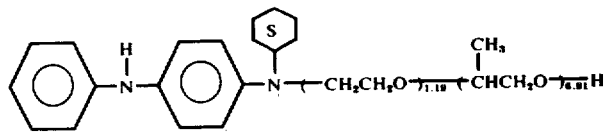

343.5 Grams of the oxyethylated N-phenyl-N'-cyclohexyl-p-phenylenediamine product of Example 26 and 3.4 grams of sodium acetate were charged to a 1 liter flask equipped with a 500 milliliter pressure equalized dropping funnel, nitrogen gas inlet, mechanical agitator, thermometer with thermowatch and dual water cooled condensers. Air cooling actuated by a solenoid valve attached to the thermowatch was used to maintain temperatures below 180° C. The amine was initially heated to 172° C., under a nitrogen gas atmosphere, and 433.7 grams by weight of propylene oxide were added over a period of 10 hours and 10 minutes to avoid excessive refluxing. The final product, after cooling, was a dark liquid exhibiting a nil primary and secondary amine content and a tertiary amine content of 1.36 milliequivalents per gram of sample.

EXAMPLE 28

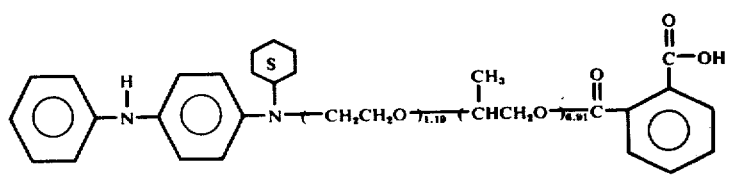

108.0 Grams by weight of the oxyalkylated N-phenyl-N'-cyclohexyl-p-phenylenediamine of Example 27 and 22.2 grams by weight of phthalic anhydride were charged into a suitable reactor (a 1 liter flask as equipped in Example 27) and heated under a nitrogen blanket to 147° C. The reaction mixture was maintained at 147°–151° C for 1 hour and 35 minutes. The final product, after cooling, was a viscous liquid and had an acid number of 63.1.

EXAMPLE 29

10.0 Grams of the product of Example 28, 5.4 grams of a 2.8928 normal potassium hydroxide solution and 84.6 grams of distilled water were charged to a vessel equipped with an agitator. The mixture was stirred until all of the product of Example 28 was solubilized. The final solution contained a ten percent by weight solution of the product of Example 28.

EXAMPLE 30

The solution of Example 29 was added to unstabilized SBR latex in an amount sufficient to provide 0.25 and 1.0 parts of antidegradant per hundred parts of rubber (phr). Thereafter, salt acid coagulation procedures as described in Example 17, were used to prepare dry crumb rubber stock.

The raw gum rubber stocks then subjected to heat ageing tests, as described in Example 17, using samples of the dried stabilized and unstabilized (SBR) rubber. The rubber was heat aged in a forced air oven at a temperature of 100° C., for a period of time, represented as days, and the percentage of gel formed was calculated. Table V illustrates the results of this aging study.

TABLE V

Heat ageing in circulating air oven at 100° C.

| Sample | phr | Unaged | 1 day | % Gel 4 days | 5 days | 6 days |
|---|---|---|---|---|---|---|
| A | 0.25 | 0 | 0 | nil | nil | nil–1.7 |
| B | 1.0 | 0 | 0 | nil | nil | 1.6 |
| C | 0.0 | 0 | 60.5–91.3 | — | — | — | nil = less than 1% gel.

EXAMPLE 31

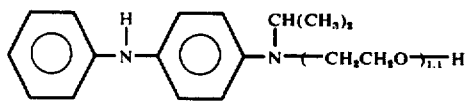

410.0 Grams of N-isopropyl-N'-phenyl-p-phenylenediamine was charged to a one liter pressure reactor and, using the procedure of Example 26, 88 grams of ethylene oxide was added thereto over a period of 11 minutes at a temperature of 141°–156° C. and pressure of up to 79 psig. The reaction mixture was maintained at 146°–155° C., with agitation, for an additional 92 minutes until the pressure gauge indicated a zero pressure. The product, after cooling, was a dark viscous liquid which showed signs of crystallization or partial solidification after a prolonged storage (>5 months). Analysis of the product indicated a nil primary amine content, 0.20 milliequivalents per gram of sample of secondary amine and 3.31 milliequivalents per gram of sample of tertiary amine.

EXAMPLE 32

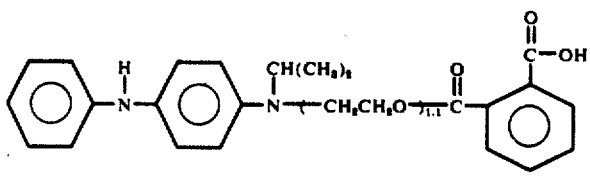

82.4 Grams of the product of Example 31 and 44.4 grams of phthalic anhydride were charged to a one liter flask as described in Example 27 and heated to 147° C. under a nitrogen atmosphere. The reaction mixture was maintained at a temperature of 141°–149° C. for a total of 66 minutes. The product, after cooling, was a dark solid melting at 78°–88° C. and exhibited an acid number of 123.1.

EXAMPLE 33

20.0 Grams of the product of Example 32, 21.2 grams of 2.8928 normal potassium hydroxide and 158.8 grams of distilled water were charged to a vessel and stirred until a solution resulted containing 10 percent by weight of the product of Example 32.

EXAMPLE 34

The product of Example 33 was incorporated into SBR rubber and tested at the 0.25 phr level of product as described in Example 30. The results of the heat ageing study showed a 0,0, nil, 0,0, nil and 0 gel content after 1,2,3,4,5,6 and 7 day, respectively, heat ageing at 100° C.

EXAMPLE 35

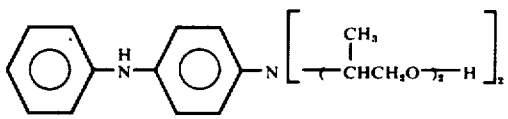

8105 Grams of p-aminodiphenylamine was charged to a reactor and heated to 101° C under a vacuum of 29 inches of mercury. The reactor was then sealed and 11.3 pounds of propylene oxide were fed to the reactor over a 2 hour and 38 minute period at temperatures up to 146.2° C and pressures up to 18 psig. The reaction mixture was thereafter stirred for an additional 17 minutes during which time the pressure in the reactor dropped to zero psig. The reactor was opened and 40.5 grams of anhydrous sodium acetate was added under 24 inches of mercury vacuum. The reactor was sealed and an additional 11.3 pounds of propylene oxide was fed thereto over a 2 hour and 4 minute period at temperatures of 148.8°–157.5° C. and pressures up to 23 psig. An additional 12 minute stirring period was required to digest the propylene oxide to 0 psig.

The final product was a dark liquid whose viscosity was found to be 26,600 poises at 25.7° C. The weight per gallon of this material was 9.03 pounds, the primary amine content was nil, the secondary amine content was found to be 0.16 milliequivalents per gram of sample while the tertiary amine content was found to be 2.32 milliequivalents per gram of sample. The final product contained 4 moles of propylene oxide per mole of p-aminodiphenylamine.

EXAMPLE 36

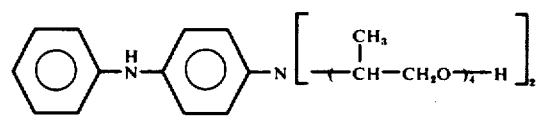

p-aminodiphenylamine was oxypropylated by the procedure of Example 35 to yield a material containing 8 moles of propylene oxide per mole of the amine. The final product showed a nil primary amine content, a secondary amine level of 0.11 milliequivalents per gram of sample and a tertiary amine content of 1.48 milliequivalents per gram of sample. The final product exhibited a viscosity at 25.1° C. of 179.6 poises and a weight per gallon of 8.82 pounds.

EXAMPLE 37

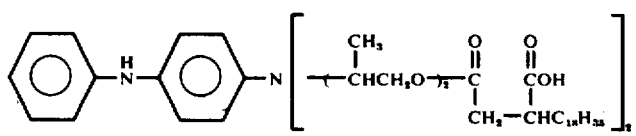

208.4 Grams of the product of Example 36 and 350.7 grams of isooctadecenylsuccinic anhydride were charged to a suitable reactor and heated under a nitrogen atmosphere to 150° C. The reaction mixture was held at 147°–150° C. for a period of 76 minutes. The final product, after cooling, was a dark viscous liquid having an acid number of 97.2.

EXAMPLE 38

The product of Example 37 was incorporated into SBR 1500 rubber by procedures described in Examples 29 and 30 at the 0.25 and 0.50 phr levels. Heat ageing studies carried out by procedure described in Example 30 gave the results as tabulated in Table VI.

TABLE VI

| | % Gel After 100° C Heat Aging For: | | | | | | | |
|---|---|---|---|---|---|---|---|---|
| | | | | DAYS | | | | |
| PHR | 4 | 5 | 6 | 7 | 8 | 9 | 10 | 11 |
| 0.25 | 0.0 | 0.0 | 0.0 | 1.8 | — | — | — | — |
| 0.25 | 0.0 | 0.0 | 0.0 | 0.8 | — | — | — | — |
| 0.50 | 0.0 | 0.5 | 0.2 | 3.3 | 2.9 | 3.5 | 5.6 | 12.0 |

EXAMPLE 39

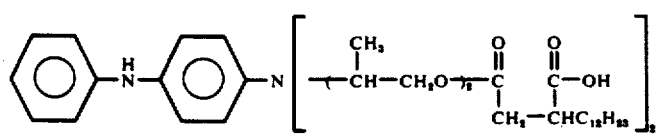

208.3 Grams of the product of Example 35 and 266.3 grams of dodecenylsuccinic anhydride were heated together in a suitable reactor under a nitrogen atmosphere to 151.7° C. The reaction mixture was held for 61 minutes at 148.8°–151.7° C. The final product, after cooling, was a dark low melting solid with an acid number of 116.2.

EXAMPLE 40

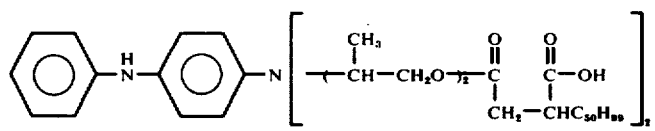

52.1 Grams of the product of Example 35 and 276.1 grams of a C50 alkyl substituted succinic anhydride were heated together in a suitable reactor under a nitrogen atmosphere to 147° C and held at 147°–148.1° C for a period of 63 minutes. The product, after cooling, was a dark, viscous liquid with an acid number of 35.7. The product, when incorporated into SBR rubber according to procedures of Examples 29 and 30 at a 0.25 phr level, acted as an antidegradant. Gel content, of the rubber containing this product, was zero after 1 day at 100° C. and only 1.3% after a 2 day heat ageing period in a 100° C air circulating oven.

EXAMPLE 41

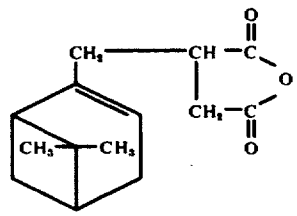

98.1 Grams of maleic anhydride and 141.9 grains of 60 β-pinene (96% pure) were charged to a suitable reactor and heated under a nitrogen atmosphere to 146.8° C. The reaction was exothermic and some cooling was necessary. The reaction mixture was held at 143.8°–146.8° C. for a 1½ hour period. The mixture was then heated to 199.5° C and held for an additional 1½ hour period at 197°–202° C. The product, after cooling, was a waxy solid which contained about 1% unreacted maleic anhydride by NMR analysis. The acid number of the product was 483.2 and the molecular weight was found to be 245.

EXAMPLE 42

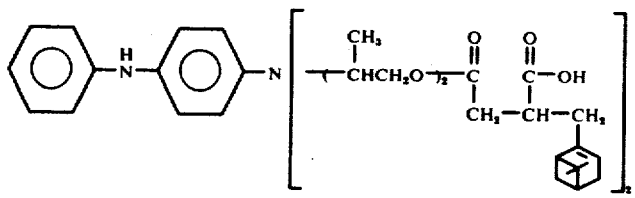

417.5 Grams of product, prepared as described in Example 41, was heated in a suitable reactor under a nitrogen atmosphere to 116.7° C. 409.7 grams of the product of Example 35 was charged to a pressure equalized, heated, dropping funnel and heated to 115°–125° C., then added to the reactor over a 10 minute period. The reaction was exothermic and cooling was necessary to maintain a temperature below 129° C. The reaction mixture was then held for 6 hours at 121.5°–128° C. The product, after cooling, was a dark solid, melting between 68° and 78° C., and exhibited an acid number of 121.0. The molecular weight of this material was found to be 862.

EXAMPLE 43

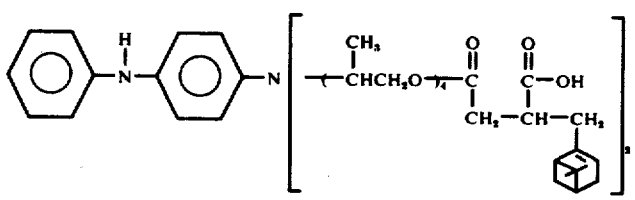

333.0 Grams of a product prepared by the procedure of Example 41 was reacted with 450.3 grams of the product of Example 36 at 122°–129° C. under a nitrogen atmosphere for 3 hours. The product, after cooling, was an extremely viscous liquid and exhibited an acid number of 100.7.

EXAMPLE 44

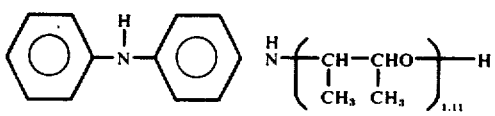

184.2 Grams of paraaminodiphenylamine was charged to a 500 milliliter flask equipped with a gas inlet tube, a pressure equalized addition funnel, a mechanical agitator, a thermometer with a thermowatch and a water cooled condenser. The amine was heated to 104° C. and 11.5 grams of hydrogen chloride gas were added over a 13 minute period. The reaction was exothermic and the temperature rose to 165.2° C. 79.9 Grams of 2,3-butylene oxide was added to the reaction mixture over a 19 minute period. Refluxing resulted and the temperature dropped from 113.2° C. at the start of the addition, to 78.5° C. at the end of the addition. Heating was continued for approximately 14 hours until refluxing had ceased. 33.9 Grams of anhydrous sodium carbonate were added at 124° C, refluxing resumed, and the reaction mixture was heated for approximately 11 hours. The final product was filtered (hot) through a glass fritted funnel. Amine analysis of the final product gage the following:

| Total Amine | - Calc'd | = 3.70 | milliequivalents/g of sample |
|---|---|---|---|
|  | - Found | = 3.69 | " |
| Primary Amine |  | = 0.70 | " |
| Secondary Amine |  | =2.84 | " |
| Tertiary Amine |  | = 0.15 | " |

EXAMPLE 45

98.5 Grams of the product of Example 44 was charged to a suitable reactor and heated to 165° C. under a nitrogen atmosphere. 0.74 grams of sodium methylate was added thereto. 70.2 Grams of ethylene oxide was then added subsurface to the reaction mixture over a period of 41 minutes at temperatures of 159°–180.5° C. The final product exhibited the following amine analysis.

| Total Amine | - Calc'd | = 2.16 | milliequivalents/g of sample |
| --- | --- | --- | --- |
|  | - Found | = 2.13 | " |
| Primary Amine |  | = 0.08 | " |
| Secondary Amine |  | = 1.46 | " |
| Tertiary Amine |  | = 0.59 | " |

EXAMPLE 46

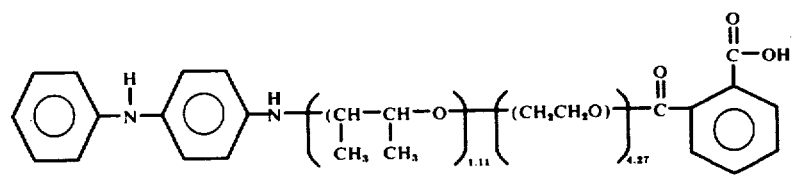

90.4 Grams of the product of Example 45 and 29.6 grams of phthalic anhydride were reacted as shown in Example 32. The final product, after cooling was a dark solid having an acid number of 93.5

EXAMPLE 47

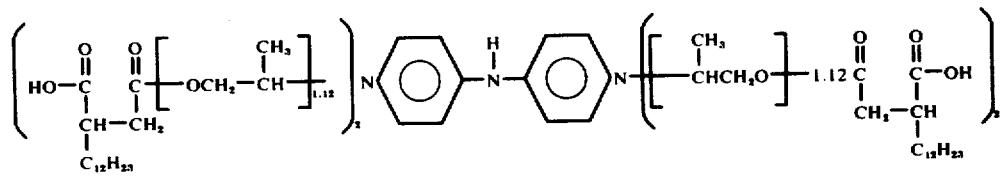

99.6 Grams of 4,4'-diaminodiphenylamine was charged to a suitable reactor and heated under a nitrogen atmosphere to 170° C. 130.2 grams of propylene oxide were added to the amine over a 5¾ hour period at 148°–179° C. Some refluxing of the oxide occurred during the addition. 57.4 grams of the resulting oxypropylated 4,4'-diaminodiphenylamine and 133.0 grams of dodecenylsuccinic anhydride were then charged to a suitable reactor and heated to 150° C. for 1 hour, under a nitrogen atmosphere with agitation. The final product, after cooling, was a dark solid, melting in a range of 94°–104° C, having an acid number of 128.2.

SBR rubber crumbs containing 0.25 phr of the final product showed no gel after a 1 day 100° C. heat ageing period and only 2.8% gel content after a 2 day heat ageing period at 100° C.

EXAMPLE 48

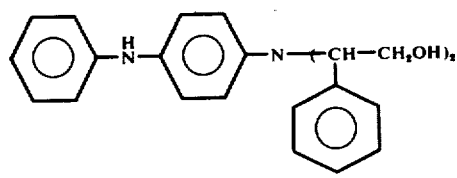

184.2 Grams of para aminodiphenylamine is charged to a suitable reactor and heated to 175°–180° C under a nitrogen atmosphere. 240.3 grams of styrene oxide is added so as to prevent excessive refluxing. The mixture is then heated at 175°–180° C. until all of the oxide has reacted as evidenced by cessation of the reflux. The final product has a total amine value of 2.36 milliequivalents per gram of sample.

EXAMPLE 49

296.2 Grams of phthalic anhydride is reacted with 424.5 grams of the product of Example 48 in the manner of Example 12. The product exhibits an acid number of 155.7.

EXAMPLE 50

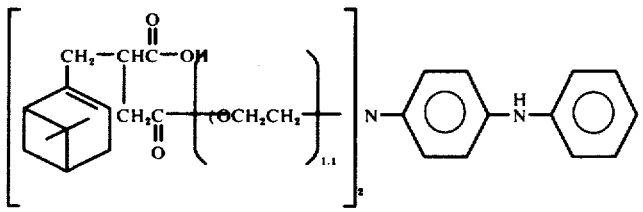

282.6 Grams of B-pinene (96% pure) was charged to a suitable reactor and heated under a nitrogen atmosphere to 140° C. 196 grams of ground maleic anhydride was added to the reactor over a 3 minute period. The reaction was exothermic and the temperature rose to 158° C. The reaction mixture was held for 4¾ hours at temperatures of 145°–158° C. NMR analysis of the reaction mixture showed the unreacted maleic anhydride level at 5.4%. 268.7 Grams of molten oxyethylated para aminodiphenylamine, prepared by process described in Example 1, was added to the reaction mixture at a temperature of about 100° C. The molten amine was added as quickly as it could be poured. The reaction was exothermic and the temperature rose to 156° C. within 2 minutes. The final product, after cooling, was a dark solid, melting in the 60°–70° C. range, and exhibited an acid number of 134.9.

EXAMPLE 51

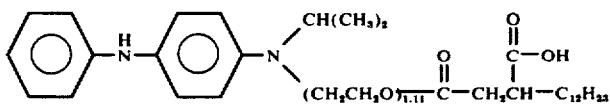

135.0 Grams of N-isopropyl-N'-phenyl-p-phenylenediamine, which had been ethoxylated by the method of Example 31, and 128.5 grams of tetrapropenylsuccinic anhydride were charged to a 500 milliliter flask equipped as described in Example 14. The condenser was not water cooled. The reaction mixture was heated to 133°–140.8° C for approximately 63 minutes under a nitrogen atmosphere. The final product, a solid, exhibited an acid number of 97.0 (Theory=104.5) and melted in a 45°–55° C. range.

EXAMPLE 52

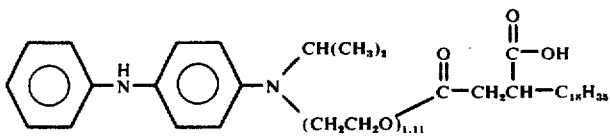

137.6 Grams of N-isopropyl-N'-phenyl-p-phenylenediamine, which had been ethoxylated by the method of Example 31, and 175.2 grams of isooctadecnylsuccinic anhydride were charged to a 500 milliliter flask equipped as described in Example 39 and heated to 134°–135° C, for 1 hour, under a nitrogen atmosphere. The final product, a viscous liquid (approx. 29,800 poises at 24° C) exhibited an acid number of 87.8 (Theory=89.7).

EXAMPLE 53

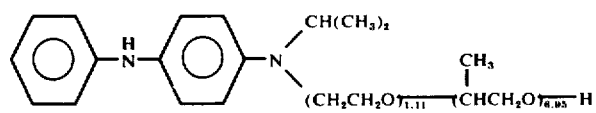

137.8 Grams of N-isopropyl-N'-phenyl-p-phenylenediamine, which had been ethoxylated by the method of Example 31, and 1.4 grams of sodium methoxide were charged to a one liter reaction flask, equipped with a 500 milliliter pressure equalized dropping funnel, nitrogen gas inlet, mechanical agitator, thermometer with thermowatch and dual water cooled condensers. The ethoxylated amine was initially heated to 175° C under a nitrogen atmosphere. 218.2 Grams of propylene oxide were charged to the pressure equalized funnel. The oxide was added, over approximately a 7 hour period, at such a rate as to prevent excessive refluxing of the oxide at 167°–178° C. The reaction vessel was weighed after the oxide addition was completed and it was found that 202.2 g. of propylene oxide had reacted with the amine. The final product was a liquid with a viscosity of 32.4 poises at 23° C.

EXAMPLE 54

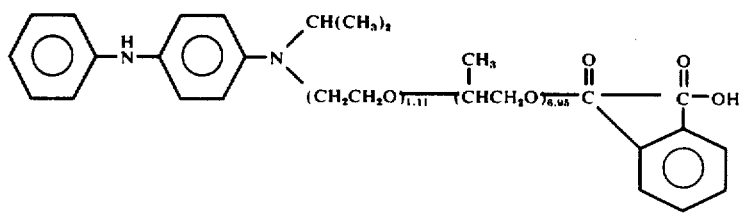

135.8 Grams of the product, prepared in Example 53, and 29.6 grams of phthalic anhydride were charged to a 250 milliliter flask, equipped as in Example 39, and heated under a nitrogen atmosphere to 149.5° C. The reaction mixture was held at 148°–149.5° C for 62 minutes. The final product, a viscous liquid (13,600 poises at 23.5° C), exhibited an acid number of 68.2 (Theory=67.8).

EXAMPLE 55

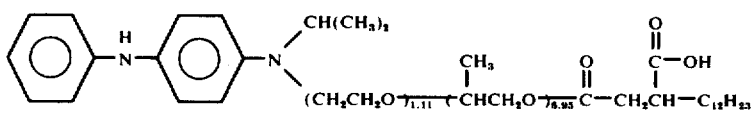

135.8 Grams of the product of Example 53 and 52.4 grams of tetraprepenylsuccinic anhydride were reacted together for 1 hour at 134°–136° C under a nitrogen atmosphere in a suitable reactor. The final product, a viscous liquid (1830 poises at 23.5° C) exhibited an acid number of 65.2 (Theory=59.6).

EXAMPLE 56

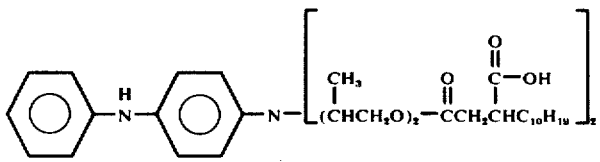

208.3 Grams of product prepared by the process of Example 35, with the exception that it was prepared in a flask at atmospheric pressure, and 236.5 grams of N-decenyl succinic anhydride were heated together in a suitable reactor, under nitrogen, to about 146° C. The reaction mixture was held for 118 minutes at 145°–146° C and the final product exhibited an acid number of 119.9 with a viscosity of 55,400 poises at 23.2° C.

EXAMPLE 57

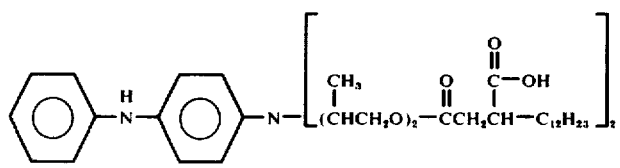

208.3 Grams of product prepared by the process of Example 35, with the exception that it was prepared in a flask at atmospheric pressure, and 262 grams of N-dodecenyl succinic anhydride were heated together in a suitable reactor, under nitrogen, to about 146° centigrade. The reaction mixture was held for 115 minutes at about 144.8°–146° C and the final product exhibited an acid number of 122.2 with a viscosity of 4,770 poises at 80° C.

EXAMPLE 58

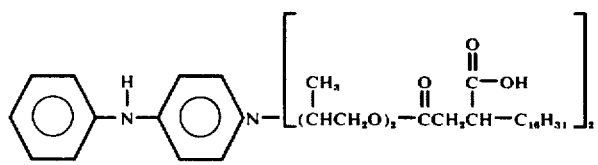

208.3 Grams of product prepared by the process of Example 35, with the exception that it was prepared in a flask at atmospheri pressure, and 320.5 grams of N-hexadecenyl succinic anhydride were maintained at about 143°–145° C for forming, under nitrogen. The final product exhibited an acid number of 105.7 and a viscosity of 4,190 poises at 23.8° C.

EXAMPLE 59

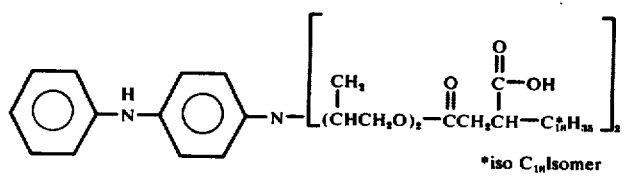

*iso C₁₈ Isomer 208.3 Grams of product prepared by the process of Example 35, with the exception of Example 46, and 346.8 grams of isooctadecenyl succinic anhydride were maintained at about 144°–146.5° C for 68 minutes under nitrogen. The final product exhibited an acid number of 100.8 and viscosity of 15,800 poises at 23.8° C.

EXAMPLE 60

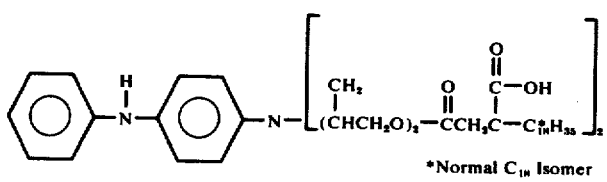

*Normal C₁₈ Isomer 208.3 Grams of product prepared by the process of Example 35, with the exception of Example 46, and 347.8 grams of N-octadecenyl succinic anhydride were maintained at about 144.8°–145° C for 127 minutes, under nitrogen. The final product exhibited an acid number of 100.8 and viscosity of 33,600 poises at 23.5° C.

EXAMPLE 61

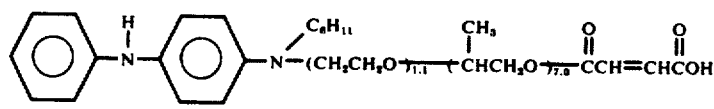

336.4 Grams of product prepared by the process of Example 27 and 45.7 grams of maleic anhydride were maintained at about 99°–100° C for 1 hour. The final product exhibited an acid number of 65.8 and viscosity of 7,140 poises at 24° C.

We claim:
1. A compound of the formula

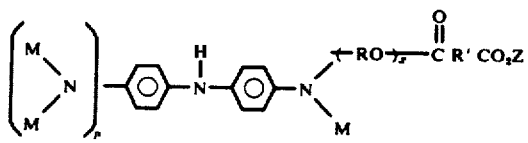

wherein, X is from 1 to 12; Z is a member selected from the group consisting of —H, —NH₄, alkali metal, lower alkyl and lower hydroxyalkyl; R is a member selected from the group consisting of ethylene, 1,2-propylene, 1,2-butylene, 2,3-butylene, styrylene and mixtures thereof; R' is selected from the group consisting of substituted or unsubstituted arylene moieties derived from an aryl dicarboxylic acid anhydride and in which any substituent is selected from the group consisting of carboxy, halo and lower alkyl substituents; M is a member selected from the group consisting of alkyl and cycloalkyl hydrocarbon of up to 20 carbon atoms,
$+RO)_x$ H, and

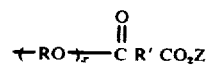

wherein R, X, R' and Z are as above defined; and p is an integer from 0–1, providing when p is O,

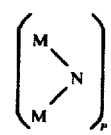

is hydrogen.

2. The compound of claim 1 wherein

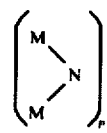

is hydrogen.

3. The compound of claim 1 wherein R' is phenylene or naphthalene.

4. The compound of claim 3 of the formula:

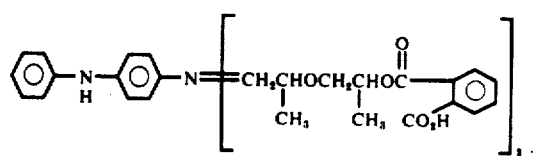

5. The compound of claim 3 of the formula:

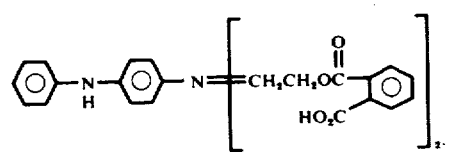
6. The compound of claim 3 of the formula:
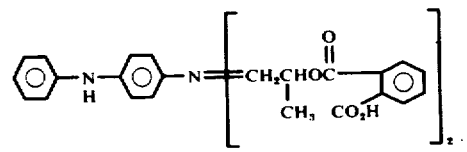
7. The compound of claim 3 of the formula:
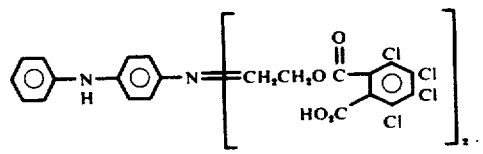
8. The compound of claim 3 of the formula:
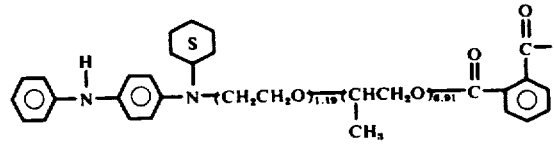
9. compound of claim 3 of the formula:
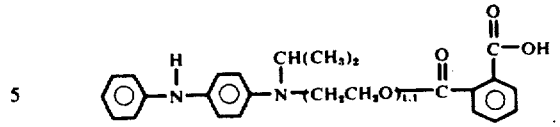
10. The compound of claim 3 of the formula:
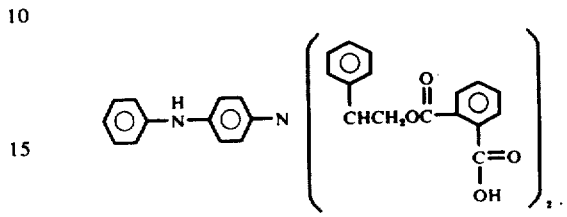
11. The compound of claim 3 of the formula:
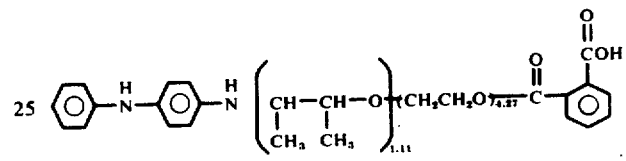
12. The compound of claim 3 of the formula
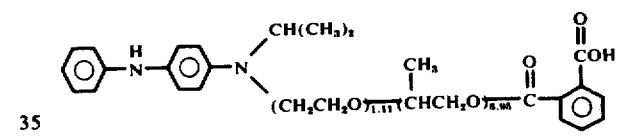
13. The compound of claim 3 of the formula
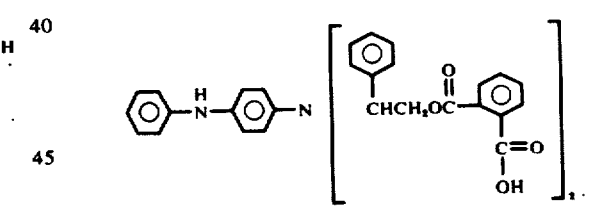
* * * * *

UNITED STATES PATENT AND TRADEMARK OFFICE
CERTIFICATE OF CORRECTION

PATENT NO. : 4,009,198
DATED : February 22, 1977
INVENTOR(S) : Joseph A. Pawlak and Francis J. Bajer It is certified that error appears in the above-identified patent and that said Letters Patent are hereby corrected as shown below:

Column 1, line 52, "4-alkylaminodiphenylamincs" should read --4-alkylaminodiphenylamines--. Column 2, line 26, "at least two nuclear atoms" should read --at least two nuclear carbon atoms--. Column 6, line 24, "between 181°-188°C" should read --between 180°-188°C. Column 9, line 25, "containing acid antidegradants" should read --containing said antidegradants--. Column 10, line 39, "90 minutes 305" should read --90 minutes 395--. Column 25, Example 59 and Example 60, $$\text{"} \begin{array}{c} CH_2 \\ | \\ (CHCH_2O)_2 \end{array} \text{"} \quad \text{should read} \quad -- \begin{array}{c} CH_3 \\ | \\ (CHCH_2O)_2 \end{array} --.$$

Signed and Sealed this

Twentieth Day of September 1977

[SEAL]

Attest:

RUTH C. MASON
Attesting Officer

LUTRELLE F. PARKER
Acting Commissioner of Patents and Trademarks